United States Patent
Choi et al.

(10) Patent No.: US 10,232,399 B2
(45) Date of Patent: Mar. 19, 2019

(54) SLOT COATER HAVING FLUID CONTROL UNIT

(71) Applicant: LG CHEM, LTD., Seoul (KR)

(72) Inventors: Jae-Hoon Choi, Daejeon (KR); Won-Chan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 26 days.

(21) Appl. No.: 14/918,099

(22) Filed: Oct. 20, 2015

(65) Prior Publication Data

US 2016/0114340 A1    Apr. 28, 2016

(30) Foreign Application Priority Data

Oct. 22, 2014  (KR) .................. 10-2014-0143576
Oct. 22, 2014  (KR) .................. 10-2014-0143579
Sep. 18, 2015  (KR) .................. 10-2015-0132579

(51) Int. Cl.
| | | |
|---|---|---|
| *B05C 5/00* | (2006.01) | |
| *B05C 9/14* | (2006.01) | |
| *H01M 4/04* | (2006.01) | |
| *H01M 4/139* | (2010.01) | |
| *B05C 5/02* | (2006.01) | |

(52) U.S. Cl.
CPC ............. *B05C 5/005* (2013.01); *B05C 5/001* (2013.01); *B05C 5/027* (2013.01); *B05C 5/0254* (2013.01); *B05C 9/14* (2013.01); *H01M 4/0404* (2013.01); *H01M 4/139* (2013.01)

(58) Field of Classification Search
CPC ......... B05C 5/001; B05C 5/005; B05C 5/007; B05C 5/008; B05C 5/0254; B05C 5/0258; B05C 5/0262; B05C 5/0266; B05C 5/027; B05C 5/0275; B05C 1/08; B05C 11/10; B05B 1/24; B05B 1/044; B05B 1/34; B05B 15/0406; B05D 1/305; D21H 23/48; G03C 2001/7433; Y10S 118/04
See application file for complete search history.

(56) References Cited

U.S. PATENT DOCUMENTS

| | | | | |
|---|---|---|---|---|
| 3,767,346 A | * | 10/1973 | Mihalik ............. | B29C 47/0021 425/378.1 |
| 4,332,543 A | * | 6/1982 | Fulton ................... | B29C 47/32 264/40.6 |
| 5,733,605 A | * | 3/1998 | Akiyama ............. | B05C 5/0254 118/411 |

(Continued)

FOREIGN PATENT DOCUMENTS

| | | |
|---|---|---|
| JP | 2000-233151 A | 8/2000 |
| JP | 2003-170098 A | 6/2003 |

(Continued)

*Primary Examiner* — Karl Kurple
(74) *Attorney, Agent, or Firm* — Dentons US LLP

(57) ABSTRACT

Disclosed is a slot coater, which includes a feeding unit having a passage through which a coating fluid flows in, a manifold for accommodating the coating fluid supplied through the feeding unit, a discharge unit communicating with the manifold to discharge the coating fluid accommodated in the manifold, a plurality of shim plates arranged at regular intervals in a length direction of the manifold, and a temperature control unit for generating a temperature difference between a shim plate located relatively closer to the feeding unit and a shim plate located respectively farther from the feeding unit.

6 Claims, 4 Drawing Sheets

(56) References Cited

U.S. PATENT DOCUMENTS

| | | | |
|---|---|---|---|
| 6,344,088 B1 | 2/2002 | Kamikihara et al. | |
| 6,495,196 B1 * | 12/2002 | Innes | B05C 5/001 |
| | | | 118/101 |
| 7,604,842 B2 | 10/2009 | Shida et al. | |
| 7,632,086 B2 * | 12/2009 | Veariel | B29B 9/06 |
| | | | 425/378.1 |
| 2005/0074609 A1 * | 4/2005 | Veariel | B29B 9/06 |
| | | | 428/402 |
| 2006/0096528 A1 * | 5/2006 | Kawatake | B05C 5/0262 |
| | | | 118/407 |
| 2014/0331923 A1 * | 11/2014 | Kim | B05C 5/0254 |
| | | | 118/324 |

FOREIGN PATENT DOCUMENTS

| | | |
|---|---|---|
| JP | 2003-225603 A | 8/2003 |
| JP | 2005-87955 A | 4/2005 |
| JP | 3826585 B2 | 9/2006 |
| KR | 1998-042825 A | 8/1998 |
| KR | 10-2004-0084013 A | 10/2004 |
| KR | 10-0867893 B1 | 11/2008 |
| KR | 10-2009-0081110 A | 7/2009 |
| KR | 10-2011-0098578 A | 9/2011 |
| KR | 10-2013-0087707 A | 8/2013 |

* cited by examiner

--Prior Art--

--Prior Art--

--Prior Art--

SLOT COATER HAVING FLUID CONTROL UNIT

BACKGROUND OF THE DISCLOSURE

Field of the Disclosure The present application claims the benefit of Korean Patent Application No. 10-2015-0132579 filed on Sep. 18, 2015, Korean Patent Application No. 10-2014-0143576 filed on Oct. 22, 2014, and Korean Patent Application No. 10-2014-0143579 filed on Oct. 22, 2014 with the Korean Intellectual Property Office, the disclosures of which are incorporated herein by reference in their entirety.

The present disclosure relates to a slot coater, and more particularly, to a slot coater configured to control a discharge flow rate of a coating fluid for uniform coating.

Description of the Related Art

Generally, a secondary battery includes a battery case and an electrode assembly accommodated in the battery case together with an electrolyte.

The electrode assembly has a structure in which positive electrodes, separators and negative electrodes are stacked alternately. The positive electrode and the negative electrode of the electrode assembly respectively include current collectors made of aluminum foil (Al-foil) and copper foil (Cu-foil). The positive electrode current collector and the negative electrode current collector are respectively coated with a positive electrode active material and a negative electrode active material, and an electrode tab is connected to a portion thereof where an active material is not coated.

For uniform charging or discharging of the secondary battery, a positive electrode active material layer and a negative electrode active material layer should be accurately coated on the current collector. For this, a slot coating using a slot coater is generally performed.

FIG. 1 schematically shows an essential configuration of a general slot coater for performing slot coating. As shown in FIG. 1 the slot coater includes a feeding unit 10 for introducing an active material coating solution, a manifold 11 having a substantially semi-cylindrical shape to accommodate a coating material supplied through the feeding unit 10, a slit 12 communicating with the manifold 11 to discharge the coating fluid, and a die lip 13 where the slit 12 is formed.

The coating solution flows into the manifold 11 through the feeding unit 10 to fill the manifold 11 and discharges out through the slit 12.

The coating solution discharged from the slit 12 is coated onto a substrate which is continuously progressing. A coating width of the active material coated onto the substrate is determined by the width of the slit 12 which corresponds to the length of the manifold 11.

In relation to the slot coater, Patent Literature 1 discloses an interior design method of a slot coating die for continuous uniform forming of an electrode coating catalyst slurry, which includes the step of selecting a fluid model for analyzing flow characteristics of a fluid in a die from variable property information of a catalyst slurry fluid, determining a chamber form in a slot coating die in consideration of the variable properties of the catalyst slurry fluid, and determining a process condition for forming a catalyst layer with a uniform thickness.

In Patent Literature 1, considering a flow rate relationship where a flow rate is fast at a central portion in the width direction of the die and a flow rate is slow at both end portions, the chamber is designed to have a semi-cylindrical shape of a hanger type with a convex central portion so that the coating solution has a uniform speed distribution in the width direction.

However, if a flow rate deviation is improved by changing the shape of the chamber as above, when a coating width is greatly increased to enhance productivity, the slot die may have an excessively great volume to design the chamber to have a hanger-type shape.

Patent Literature 2 discloses an apparatus and method for precise coating, which is configured to discharge a coating solution in an optimal state by installing lips with various shapes to be exchanged with each other. In Patent Literature 2, the precise coating apparatus includes a fixed block, an upstream die and a downstream die respectively installed at an upstream die block and a downstream die block mounted to the fixed block, an upstream lip and a downstream lip respectively fixed to the upstream die and the downstream die in an exchangeable way, and a manifold for supplying a coating solution.

Meanwhile, there has proposed a technique for implementing various coating widths by changing a designed size value of a shim plate which defines the inner space of the manifold and the width of the slit. In other words, as shown in FIG. 2, a manifold 11 having a long length and broad shim plates 14a, 14b, 14c having a size similar to the manifold are adopted to correspond to a coating width in order to increase a coating area, and a non-coating portion 15 is provided at each area between the shim plates 14a, 14b, 14c so that discharge units 16a, 16b, 16c are separated by the non-coating portion 15 in the slot coater.

However, in the slot coater configured as above, a feeding unit 10' having a pipe shape is connected to the center of the manifold 11 so that a fluid passing through the center has a relatively fast flow rate. For this reason, flow rates at the discharge units 16a, 16b, 16c corresponding to the shim plates 14a, 14b, 14c separated by the non-coating portions 15 are different from each other (see the graph of FIG. 3), and thus different amounts of fluid are coated by the discharge units 16a, 16b, 16c, which deteriorates the uniformity of final products. Therefore, there is needed an urgent improvement.

RELATED LITERATURES

Patent Literature

Patent Literature 1: Korean Unexamined Patent Publication No. 2011-0098578
Patent Literature 2: Korean Unexamined Patent Publication No. 2004-0084013

SUMMARY OF THE DISCLOSURE

The present disclosure is designed to solve the problems of the related art, and therefore the present disclosure is directed to providing a slot coater which may control viscosity of a fluid so that an outlet flow rate deviation between discharge units separated by a non-coating portion of a shim plate may be decreased.

In one aspect of the present disclosure, there is provided a slot coater, which includes a feeding unit having a passage through which a coating fluid flows in; a manifold for accommodating the coating fluid supplied through the feeding unit; a discharge unit communicating with the manifold to discharge the coating fluid accommodated in the manifold; a plurality of shim plates arranged at regular intervals in a length direction of the manifold; and a temperature control unit for generating a temperature difference between a shim plate located relatively closer to the feeding unit and a shim plate located respectively farther from the feeding unit.

The temperature control unit may be a heating unit for heating the shim plate located respectively farther from the feeding unit to have a temperature higher than the shim plate located relatively closer to the feeding unit.

The feeding unit may be connected to a center of the manifold in the length direction, and shim plates located at both ends of the manifold may be heated to have a temperature higher than a shim plate located at the center of the manifold closest to the feeding unit.

The heating unit may be provided to at least one surface of the shim plates located at both ends of the manifold.

The heating unit may be disposed at upper and lower surfaces of the shim plate and heat the upper and lower surfaces of the shim plate simultaneously.

The coating fluid may contain water or N-methyl pyrrolidone (NMP) as a solvent, and an operation temperature of the heating unit may be set to be lower than a boiling point of the solvent.

The temperature control unit may be a cooling unit for keeping the shim plate located relatively closer to the feeding unit to have a temperature lower than the shim plate located respectively farther from the feeding unit.

The feeding unit may be connected to a center of the manifold in the length direction, and a shim plate located at the center of the manifold closest to the feeding unit may be cooled to have a temperature lower than shim plates located at both ends of the manifold.

The feeding unit may be made of a pipe, and the cooling unit may be a cooling tube which is inserted into the passage of the feeding unit and into which a cooling water is supplied.

The coating fluid may contain water or NMP as a solvent, and an operation temperature of the cooling unit may be set to be higher than a freezing point of the solvent.

A coating width may be determined by the length of the manifold, and a non-coating portion may be formed due to an interval between the plurality of shim plates.

The shim plate may have a rectangular body, and the shim plate may be disposed so that one end in the length direction is located toward the manifold and the other end is located toward the discharge unit.

An odd number of shim plates may be provided at regular intervals, and a shim plate located in the middle thereof may be closest to the feeding unit.

The shim plate may have a thickness of 0.5 mm to 1.5 mm.

The slot coater having a fluid control unit according to the present disclosure gives the following effects.

First, by keeping the feeding unit at a relatively low temperature or heating the shim plates located at both sides of the slot coater relatively higher than the shim plate located at the center, a flow rate deviation of the fluid caused by a location of the feeding unit may be decreased to ensure uniform slot coating.

Second, by providing a structure for heating a surface of the shim plate, a flow rate of the coating fluid may be precisely controlled.

Third, by adjusting a temperature of the cooling water supplied to the feeding unit, a flow rate of the coating fluid may be precisely controlled.

BRIEF DESCRIPTION OF THE DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 4:
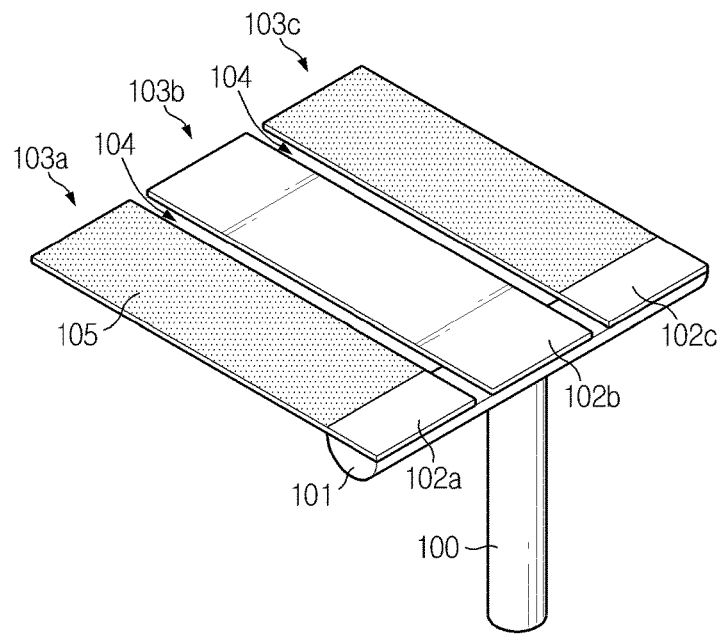
FIG. 4 is a perspective view showing an essential configuration of a slot coater according to a first embodiment of the present disclosure.

FIG. 4 is a perspective view showing an essential configuration of a slot coater according to a first embodiment of the present disclosure.

Figure 1:
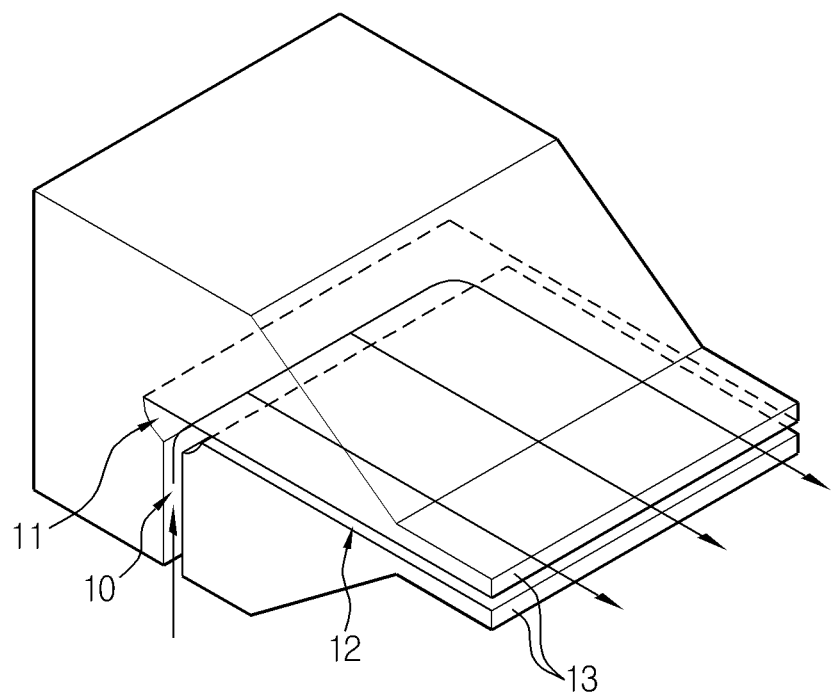
FIG. 1 is a perspective view showing an appearance of a general slot coater.
Figure 2:
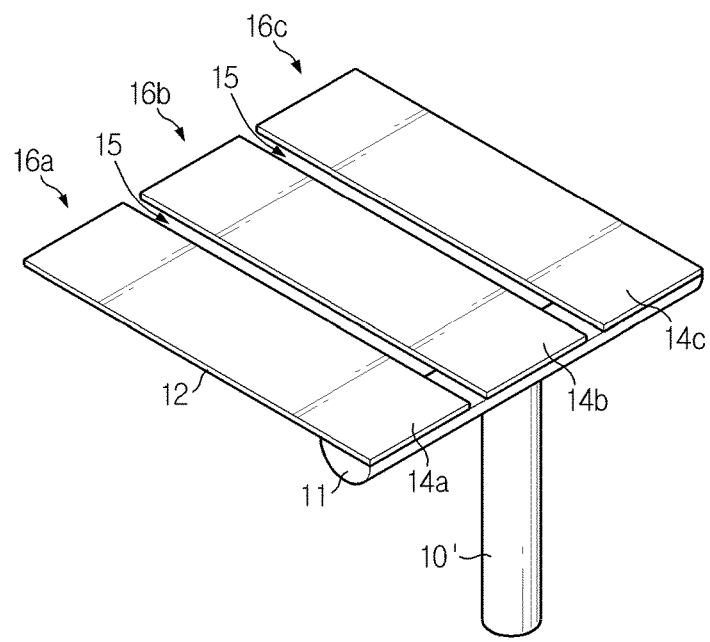
FIG. 2 is a perspective view showing an essential configuration of an existing slot coater having a non-coating portion formed between shim plates.

Referring to FIG. 4, a slot coater according to a first embodiment of the present disclosure includes a feeding unit 100 for introducing a coating fluid containing a coating material, a manifold 101 for accommodating the coating fluid supplied through the feeding unit 100, discharge units 103a, 103b, 103c communicating with the manifold 101, a plurality of shim plates 102a, 102b, 102c arranged in a length direction of the manifold 101, and a heating unit 105 provided to a part of the shim plates 102a, 102c. Though not depicted in FIG. 4 for better understanding of an inner configuration of the slot coater, the slot coater further includes a die lip 13 (see FIG. 1) forming the discharge units 103a, 103b, 103c.

The feeding unit 100 gives a passage through which a coating fluid flows into the manifold 101, and is preferably made of a pipe connected to a center of the manifold 101 in the length direction. The coating material introduced through the feeding unit 100 may employ active material slurry for an electrode.

The manifold 101 has a chamber block having an inner space serving as a buffer region for accommodating the coating fluid. The inner space of the manifold 101 may have a substantially semi-cylindrical shape. The length of the manifold 101 determines a coating width of the slot coater.

The discharge units 103a, 103b, 103c have a slit structure formed to communicate with the manifold 101 so that the coating fluid accommodated in the manifold 101 may be discharged.

The plurality of shim plates 102a, 102b, 102c is arranged at regular intervals in the length direction of the manifold 101. A non-coating portion 104 is formed at each area between the plurality of shim plates 102a, 102b, 102c, and the coating fluid is not discharged at the non-coating portion. In the present disclosure, an odd number of shim plates 102a, 102b, 102c may be provided at regular intervals, and the shim plate 102b located at the center is disposed closest to the feeding unit 100. In the present disclosure, the number of shim plates and non-coating portions is not limited to the example depicted in the figures but may be changed in various ways.

Each of the shim plates 102a, 102b, 102c has a rectangular plate body and is disposed so that its one end in the length direction is located toward the manifold 101 and the other end is located toward the discharge units 103a, 103b, 103c. The shim plates 102a, 102b, 102c may be made of metal with a thickness of 0.5 mm or above in consideration of specifications demanded for a general slot coating process. In addition, the shim plates 102a, 102b, 102c may have a thickness of 1.5 mm or below. If the thickness of the shim plates 102a, 102b, 102c is greater than 1.5 mm, a great flow rate deviation may be generated between the center portion and the edge portion of the slot coater.

The heating units 105 are respectively installed at the shim plates 102a, 102c located at both edges of the slot coater. The heating units 105 have a heating function so that the shim plates 102a, 102c corresponding thereto have a temperature relatively higher than the shim plate 102b located at the center. For this, the heating units 105 are respectively disposed at upper and lower surfaces of the shim plates 102a, 102c located at both sides of the manifold 101 based on its center.

The heating unit 105 is implemented using a common technical means such as a hot air blower or an infrared (IR) heater. For uniform coating, an operation temperature of the heating unit 105 should be set suitable for properties of the coating fluid. In detail, if the solvent contained in the coating fluid is water, the operation temperature of the heating unit 105 may be set to be lower than 100° C. which is a boiling point of water. Meanwhile, if the solvent contained in the coating fluid is N-methyl pyrrolidone (NMP), the operation temperature of the heating unit 105 may be set to be lower than 202° C. which is a boiling point of NMP.

The coating fluid discharged through both edges of the slot coater is heated by the heating unit 105, which decreases viscosity, and thus the coating fluid flows at a faster flow rate in comparison to an unheated state. Therefore, the coating fluid rapidly flowing toward the center of the slot coater and the coating fluid flowing to both edges of the slot coater may be controlled to have substantially the same flow rate.

In order to check operations of the heating unit 105, a slot coating process is performed while setting so that the shim plates 102a, 102b, 102c have a thickness of 1 mm, the coating fluid flowing into the feeding unit 100 has a temperature of 25° C., and the shim plates 102a, 102c heated by the heating unit 105 have a temperature of 37° C. In addition, the shape, flow rate, dimensions or the like of the slot coater are substantially identical to those of an existing slot coater corresponding to FIG. 3.

Figure 3:
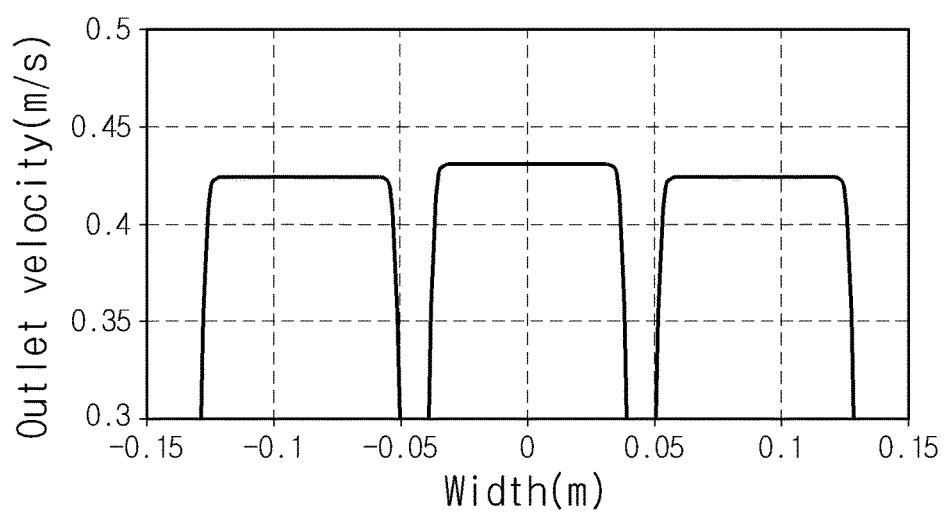
FIG. 3 is a graph showing an example of an outlet flow rate distribution of an existing slot coater.
Figure 5:
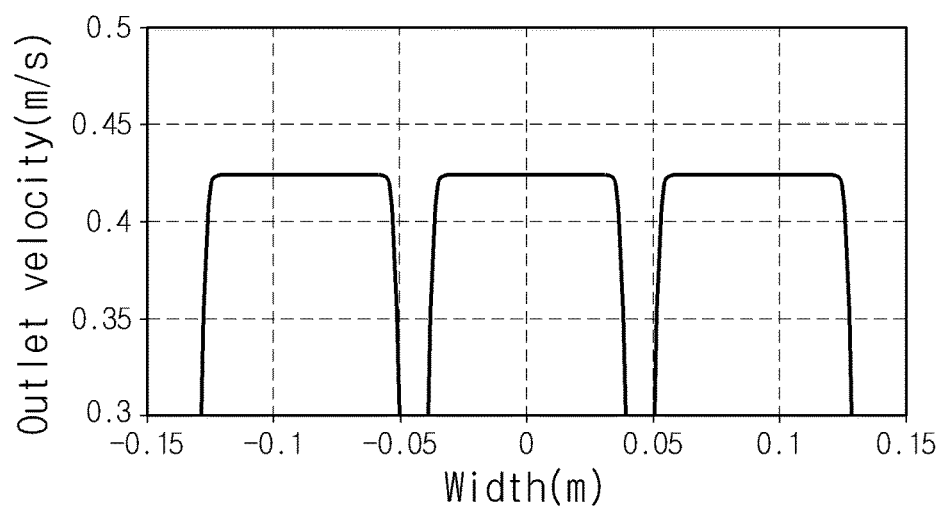
FIG. 5 is a graph showing an example of an outlet flow rate distribution of a slot coater according to a first embodiment of the present disclosure.

Referring to FIGS. 3 and 5, in case of an existing slot coater, a deviation between an average flow rate of the discharge unit 103b located at the center and a flow rate of the discharge units 103a, 103c located at both edges is about 0.63%. However, in case of the slot coater according to the present disclosure satisfying the above temperature conditions, a deviation between an average flow rate of the discharge unit 103b located at the center and a flow rate of the discharge units 103a, 103c located at both edges is about 0.01%, and thus it may be found that substantially no deviation is generated.

The slot coater configured as above according to the first embodiment of the present disclosure may perform uniform slot coating since an outlet flow rate deviation of the coating fluid is substantially not generated. The coating fluid supplied by a coating solution supply unit flows into the manifold 101 through the feeding unit 100 to fill the manifold 101 and is then discharged toward a predetermined coating roll through slits of the discharge units 103a, 103b, 103c. In addition, the coating fluid discharged from the discharge units 103a, 103b, 103c is coated onto a substrate which is progressing continuously by a coating roll.

Seeing the moving process of the coating fluid, in the slot coater according to the present disclosure, even though the feeding unit 100 is located at a center portion of the manifold 101 in the length direction, since the temperature of the shim plates 102a, 102c located at both sides of the manifold 101 is kept higher than the shim plate 102b located at the center, it is possible to prevent a flow rate deviation from being generated. In other words, the shim plates 102a, 102c located at both sides of the manifold 101 are partially heated by the heating units 105 provided thereat to keep higher temperature in comparison to the shim plate 102b at the center portion, and thus the coating fluid at both edges has relatively lower viscosity in comparison to the center portion, thereby ensuring a higher flow rate. Accordingly, the discharge units 103a, 103b, 103c exhibit a regular flow rate distribution as a whole. In addition, since the fluid viscosity of each of the discharge units 103a, 103b, 103c is adjusted by temperature control of the heating unit 105, a discharge rate may be accurately controlled.

Figure 6:
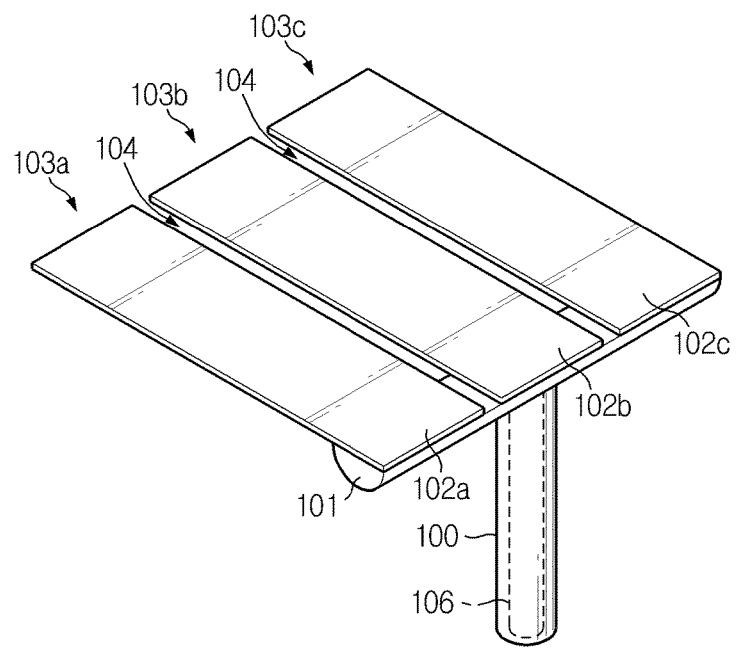
FIG. 6 is a perspective view showing an essential configuration of a slot coater according to a second embodiment of the present disclosure.

FIG. 6 is a perspective view showing an essential configuration of a slot coater according to a second embodiment of the present disclosure.

Referring to FIG. 6, a slot coater according to a second embodiment of the present disclosure includes a feeding unit 100 for introducing a coating fluid containing a coating material, a manifold 101 for accommodating the coating fluid supplied through the feeding unit 100, discharge units 103a, 103b, 103c communicating with the manifold 101, a plurality of shim plates 102a, 102b, 102c arranged in a length direction of the manifold 101, and a cooling unit 106 provided to the feeding unit 100. Though not depicted in FIG. 6 for better understanding of an inner configuration of the slot coater, the slot coater further includes a die lip 13 (see FIG. 1) forming the discharge units 103a, 103b, 103c.

In this embodiment, the feeding unit 100, the manifold 101, the discharge units 103a, 103b, 103c and the shim plates 102a, 102b, 102c are substantially identical to those of the former embodiment and thus are not described in detail here.

The cooling unit 106 cools the shim plate 102b closest to the feeding unit 100, namely located at the center of the manifold 101, to have a temperature lower than that of the shim plates 102a, 102c located at both edges. For this, the cooling unit 106 may be configured with a cooling tube which is inserted into a hollow of a pipe serving as the feeding unit 100 and into which a cooling water is supplied. At this time, the cooling tube serving as the cooling unit 106 may have one closed end. As an alternative, a predetermined pipe line may be provided to communicate with the end portion so that the cooling water may circulate.

For uniform coating, the cooling unit 106 should be set to have a temperature suitable for properties of the coating fluid. In detail, if the solvent contained in the coating fluid is water, the cooling unit 106 may have a temperature higher than 0° C. which is a freezing point of water. Meanwhile, if the solvent contained in the coating fluid is -methyl pyrrolidone (NMP), the cooling unit 106 may have a temperature higher than −24° C. which is a freezing point of NMP.

The coating fluid discharged through the center portion of the slot coater is cooled by the cooling unit 106 to have an increased viscosity, and thus the coating fluid flows at a relatively slow flow rate in comparison to a normal temperature state, not cooled. Therefore, the coating fluid flowing toward the center of the slot coater at a reduced flow rate and the coating fluid flowing to both edges of the slot coater may be controlled to have a very small flow rate deviation.

In order to check operations of the cooling unit 106, a slot coating process is performed while setting so that the shim plates 102a, 102b, 102c have a thickness of 1 mm, the coating fluid flowing into the feeding unit 100 has a temperature of 25° C., and the cooling water supplied to the cooling unit 106 has a temperature of −20° C. In addition, the shape, flow rate, dimensions or the like of the slot coater are substantially identical to those of an existing slot coater corresponding to FIG. 3.

Figure 7:
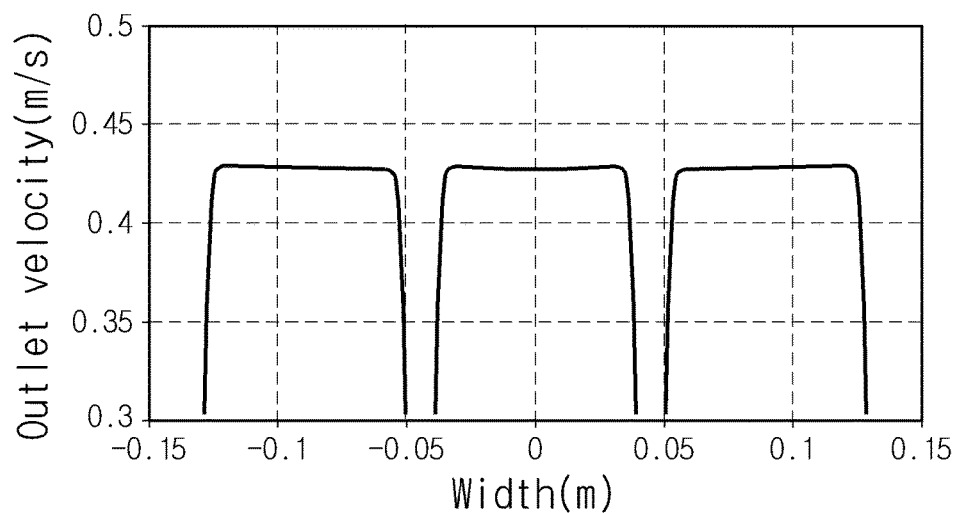
FIG. 7 is a graph showing an example of an outlet flow rate distribution of a slot coater according to a second embodiment of the present disclosure.

Referring to FIGS. 3 and 7, in case of an existing slot coater, a deviation between an average flow rate of the discharge unit 103b located at the center and a flow rate of the discharge units 103a, 103c located at both edges is about 0.63%. However, in case of the slot coater according to the present disclosure where a cooling water satisfying the above temperature conditions is supplied to the feeding unit 100, a deviation between an average flow rate of the discharge unit 103b located at the center and a flow rate of the discharge units 103a, 103c located at both edges is about 0.17%, and thus it may be found that the deviation is decreased to about ¼.

The slot coater configured as above according to the second embodiment of the present disclosure may perform uniform slot coating since an outlet flow rate deviation of the coating fluid is greatly reduced in comparison to an existing case. The coating fluid supplied by a coating solution supply unit flows into the manifold 101 through the feeding unit 100 to fill the manifold 101 and is then discharged toward a predetermined coating roll through slits of the discharge units 103a, 103b, 103c. In addition, the coating fluid discharged from the discharge units 103a, 103b, 103c is coated onto a substrate which is progressing continuously by a coating roll.

Seeing the moving process of the coating fluid, in the slot coater according to the present disclosure, even though the feeding unit 100 is located at a center portion of the manifold 101 in the length direction, since the temperature of the shim plate 102b located at the center of the manifold 101 is kept lower than the shim plates 102a, 102c located at both sides, it is possible to prevent a flow rate deviation from being generated. In other words, the shim plate 102b at the center portion of the manifold 101 is cooled by the cooling unit 106 provided thereto to keep lower temperature in comparison to the shim plates 102a, 102c located at both sides, and thus the coating fluid at the center portion has relatively higher viscosity in comparison to both edges, thereby ensuring a lower flow rate. Accordingly, the discharge units 103a, 103b, 103c exhibit a regular flow rate distribution as a whole. In addition, since the fluid viscosity of each of the discharge units 103a, 103b, 103c is adjusted by temperature control using the cooling water supplied to the cooling unit 106, a discharge rate may be accurately controlled.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

APPLICABILITY TO THE INDUSTRY

If the present disclosure is applied, it is possible to implement a slot coater capable of uniformly coating an active material coating solution to a current collector to ensure uniform charging/discharging characteristics of a secondary battery.

| Reference Symbols |
| --- |
| 100: feeding unit |
| 101: manifold |
| 102a, 102b, 102c: shim plate |
| 103a, 103b, 103c: discharge unit |
| 104: non-coating portion |
| 105: heating unit |
| 106: cooling unit |

What is claimed is:

1. A slot water comprising:
a feeding unit having a passage through which a coating fluid flows;
a manifold for accommodating the coating fluid supplied through the feeding unit; said manifold extending in a lengthwise direction with a center in between both ends of the manifold in a lengthwise direction of the manifold,
a plurality of discharge units communicating with the manifold to discharge the coating fluid accommodated in the manifold,
and a plurality of shim plates separated by a plurality of non coating portions and arranged in a lengthwise direction of the manifold wherein at least one shim plate is located at each end of the manifold and the center of the manifold, wherein each of the plurality of shim plates has a length extending from a first end to a second end in a lengthwise direction of the shim plate, and each of the plurality of shim plates is disposed so that the first end is located toward the manifold and the second end is located toward a die lip of one of the plurality of the discharge units; and
a plurality of heating units positioned on the shim plates located at both ends of the manifold in the lengthwise direction of the manifold, and each of the plurality of heating units being located on at least one surface of the shim plates extending from the first end to the second end of each of the shim plates, wherein the feeding unit is connected to the center of the manifold in the lengthwise direction of the manifold, and wherein the shim plates located at both ends of the manifold in the lengthwise direction of the manifold are heated in the lengthwise direction of the shim plate such that a temperature of the shim plates located at each end of the manifold in the lengthwise direction of the manifold is higher than a temperature of the shim plate located at the center of the manifold closest to the feeding unit.

2. The slot coater according to claim 1, wherein the coating fluid contains water or N-methyl pyrrolidone (NMP) as a solvent, and wherein an operation temperature of the heating unit is set to be lower than a boiling point of the solvent.

3. The slot coater according to claim 1 wherein a coating width is determined by the length of the manifold, and wherein at least one of the non-coating portions is formed due to an interval between the plurality of shim plates.

4. The slot coater according claim 1, wherein each of the shim plates has a rectangular body.

5. The slot coater according to claim 1, wherein an odd number of shim plates are provided, and positioned at intervals, and a shim plate located in the middle thereof is closest to the feeding unit.

6. The slot coater according to claim 1, wherein the shim plate has a thickness of 0.5 mm to 1.5 mm.

* * * * *